July 10, 1962 J. R. OISHEI 3,042,955
WINDSHIELD WIPER ARM
Filed March 11, 1959
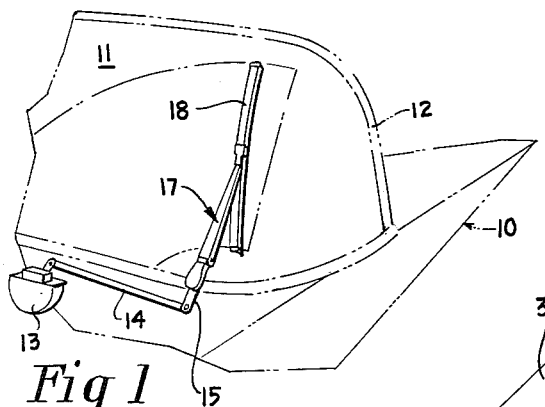
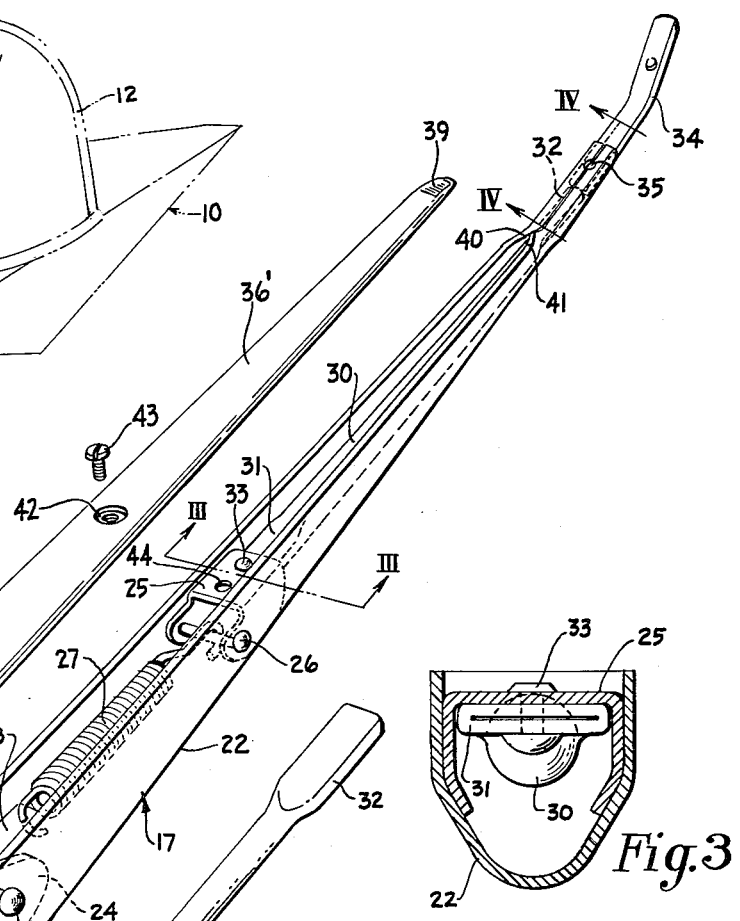
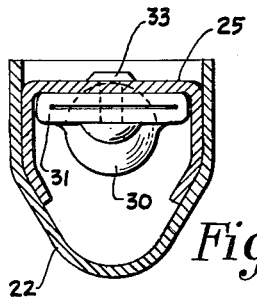
Fig. 1
Fig. 2
Fig. 3
Fig. 4
Fig. 5
Fig. 6
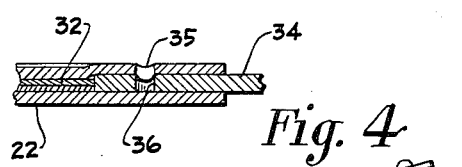
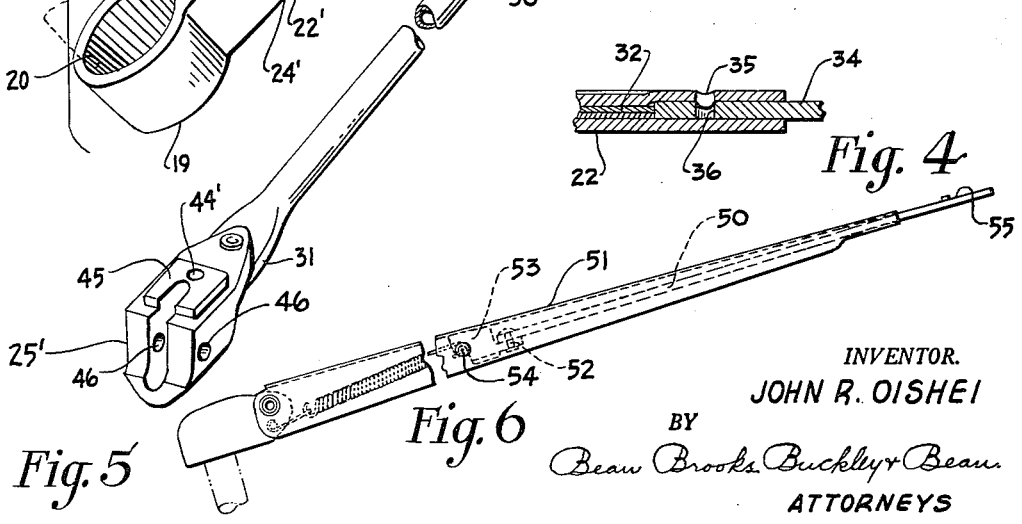
INVENTOR.
JOHN R. OISHEI
BY
Bean Brooks Buckley & Bean
ATTORNEYS

United States Patent Office 3,042,955
Patented July 10, 1962

3,042,955
WINDSHIELD WIPER ARM
John R. Oishei, Buffalo, N.Y., assignor to Trico Products
Corporation, Buffalo, N.Y.
Filed Mar. 11, 1959, Ser. No. 798,765
8 Claims. (Cl. 15—250.35)

The present invention relates to the windshield wiping art and more particularly to an improved wiper arm construction and a method of making the same. The present invention constitutes an improvement over co-pending application Serial No. 732,072 filed April 30, 1958, now abandoned.

The current use of larger windshields and longer wiping blades has necessitated the use of longer wiper arms, which, if of the conventional construction of shorter arms and if made of the same gauge of material, have a lower resistance to twisting because of their greater length. Furthermore, the longer blade areas in contact with a windshield produce a greater frictional force which, in turn, produces a greater twisting force on the wiper arms. The combination of the greater twisting force with the lack of torsional rigidity of lengthened conventional arm structures has resulted in excessive arm twisting with the attendant decreased wiping efficiency, and, under certain conditions, has even resulted in the excessive laying-over of the wiper blades in operation. While the torsional rigidity of a longer type of wiper arm may be increased by the use of heavier gauge stock, this would result in a heavier arm which would possess undesirable inertia in operation, which in turn would cause excessive wear of the various wiper linkages, especially when the wipers are operated at the higher speeds required to efficiently clear the larger expanses which they must traverse on a larger windshield. It is with both an improved highly twist resistant wiper arm construction which meets present day needs and with a method of making this improved wiper arm that the present invention is concerned.

It is accordingly the primary object of the present invention to provide a wiper arm construction which is not only highly twist-resistant but which is also capable of being easily produced from relatively low-inertia lightweight materials at a lower cost by simple manufacturing techniques.

Another object of the present invention is to provide an improved elongated wiper arm construction which retains the relatively low inertia of smaller arms to thereby permit the use of lower-cost lightweight linkages in the remainder of the wiper sysaem.

A further object of the present invention is to provide an improved elongated wiper arm construction which possesses desirable relatively low inertia when operated at high speeds, thereby minimizing over-travel of the wiper blade to provide efficient wiping action.

It is another object of the present invention to provide a method of making a twist-resistant wiper arm in an expedient manner at a lower cost. Other objects and attendant advantages of the present invention will readily be perceived hereafter.

The improved twist-resistant wiper arm construction of the present invention includes a primary arm portion adapted to effectively extend between a drive shaft and a windshield wiper. A secondary arm portion of greater resistance to twisting than said primary arm portion is secured to the latter in such a manner whereby the twist-resistant characteristics of said secondary arm portion improve the twist-resistant characteristics of the entire arm assembly. While the secondary arm portion is preferably a hollow tubular member which inherently combines the characteristics of light weight and high resistance to twisting, it will readily be understood that a solid, lightweight, twist-resistant member may also be utilized.

The improved method of the present invention comprises the steps of providing a primary arm portion, anchoring a first part of an elongated torsion-resistant member between the ends of said primary arm portion, locating a wiper holding member proximate an end of said primary arm portion and securing a portion of said primary arm portion both about a second part of said torsion-resistant member which is spaced from said first part and about said wiper holding member. The present invention will be more fully understood when the following portions of the specification are read in conjunction with the accompanying drawings wherein:

FIG. 1 is a fragmentary perspective view of a vehicle mounting a windshield wiping system, only a portion of which is shown;

FIG. 2 is a partially exploded perspective view of the improved wiper arm of the present invention, the wiper arm being in an inverted position;

FIG. 3 is a view taken along line III—III of FIG. 2;

FIG. 4 is a view taken along line IV—IV of FIG. 2;

FIG. 5 is a perspective view depicting a modified support construction for the arm of FIG. 2; and FIG. 6 is a view of a modified form of the invention.

In FIG. 1 a vehicle 10 is shown having a windshield 11 mounted in molding 12. Suitably secured underneath the instrument panel (not shown) or on the firewall (not shown) of the vehicle, is a windshield wiper motor 13 which operates in the conventional manner. Driving link 14 is coupled to motor 13 for transmitting oscillatory motion to one end of crank arm 15, the other end of which is attached to the rockshaft 16 (FIG. 2). Affixed to the other end of rockshaft 16 is a wiper arm 17, and suitably secured to arm 17 is a wiper blade 18. It will be understood that another wiper blade (not shown) is linked to the wiper motor in a similar manner.

The improved wiper arm (FIG. 2) includes a head portion 19 having a blind tapered fluted bore 20 therein which is adapted to receive one end of rockshaft 16. A spring retainer 21 is mounted in head 19 for retaining the arm head 19 on rockshaft 16 in accordance with the teaching of Patent No. 2,781,540. The specific construction for retaining head 19 on rockshaft 16 forms no part of the present invention, and any other suitable mounting arrangement may be used.

The wiper arm 17 includes a tapered channel-shaped member 22 having opposed sides, member 2 being pivotally mounted on head portion 19 by rivet 22' which extends through aligned apertures (not numbered) in ears 23 and 24 on head portion 19 and aligned apertures in ears 23' and 24' on channel 22. A bracket 25 (FIGS. 2 and 3) is securely fastened between the ends of channel 22 by rivet 26 which extends through aligned apertures in both the bracket and the channel. It can readily be seen from FIG. 3 that bracket 25 fits in complementary mating relationship with a portion of the internal surface of channel 22. Because of this fit, bracket 25 is securely held in position by rivet 26. Bracket 25, as shown in FIGS. 2 and 3, is a metal stamping. The rivet 26 which secures bracket 25 in position, serves the additional function of providing an anchor for one end of spring 27, the other end of this spring being affixed to strap 28 which, in turn, is attached to pin 29 extending between ears 23 and 24. As is well known in the art, spring 27 provides the necessary force for causing arm 22 to provide optimum wiping pressure to the wiper carried thereby.

As briefly mentioned above, a wiper arm having substantial length ordinarily has a relatively low resistance to twisting, especially if it is made of desirable relatively light stock which provides low inertia in operation. In accordance with the present invention, a construction is provided for increasing the torsional rigidity of the wiper arm in a simple and expedient manner which permits the use of lightweight materials.

The wiper arm includes a torsion tube 30 for increasing torsional rigidity of the arm. This tube may be made of aluminum or other similar lightweight material which does not materially increase the weight of the arm. The advantage of using a tube is that it combines the features of high twist resistance and low weight. This high twist resistance of tube 30 is imparted to channel 22 in the following manner: The ends of tube 30 are flattened as at 31 and 32 (FIGS. 2 and 5), as by bending. A rivet 33 securely fastens flattened end 31 to bracket 25 which, as described above, is secured to the opposite sides of channel 22. Torsion tube 30 is also secured proximate the small end of channel 22 by deforming the latter about tube end 32 by swaging or bending, or a combination of both. The affixing of bracket 25 to the opposed sides of channel 22 prevents these sides from moving relative to each other because the twist resistance of the torsion tube is transferred to the channel sides through the bracket, the latter being securely held at the above-mentioned swaged joint. Because the channel sides are thus held against moving relative to each other, the channel member has relatively great twist resistance, it being understood that channel 22 can only twist when its sides move relative to each other. The same channel deforming operation, which is used to secure end 32, is simultaneously used to rigidly affix saber 34 to the end of channel 22, saber 34 being for the purpose of mounting a windshield wiper. More specifically, during assembly, the end of saber 34 is preferably placed in abutting relationship with the end of flattened tube portion 32 (FIG. 4), and then the sides of the channel are deformed about these elements in a single operation. As can best be seen from FIG. 4, the edges of the channel member surrounding area 35 are upset by a swaging operation to securely engage aperture 36 in saber 34 for the purpose of securely retaining the saber in position on channel 22. It will readily be appreciated that the riveting construction at one end of torsion tube 30 and the deforming of channel 22 about the other end thereof rigidly secures torsion tube 30 within the confines of channel member 22 so that the torsional rigidity of tube 32 imparts torsional rigidity to the entire arm structure.

To complete the assembly, a cover plate 36' is provided. This cover plate has flanged portions 37 and 38 which fit within the legs of channel 22. The end 39 of cover 36 is formed to fit underneath the bent-over portions 40 and 41 at the deformed end of channel 22. An aperture 42, which is provided in cover 36, is adapted to be in alignment with tapped aperture 44 in bracket 25 when cover 36 is in assembled position on channel 22. A screw 43 extends through aperture 42 and is received in aperture 44. Thus, the cover plate is rigidly held on channel 22 by screw 43 and by channel portions 40 and 41 which engage cover end 39.

A modified bracket structure 25' is shown in FIG. 5 for use in lieu of bracket 25, if desired. Bracket 25' serves the same function as bracket 25 but is made by die-casting in the interest of decreased manufacturing costs. Furthermore, bracket 25' has a seat 45 formed integrally therewith, the seat providing a large bearing area for the under side of cover 36. An aperture 44' is provided in bracket 25' for receiving a fastening member such as screw 43, and aligned apertures 46 are provided in bracket 25' for receiving a rivet, such as 26 shown in FIG. 2.

In FIG. 6 a modified construction of the present invention is disclosed. In this embodiment an elongated solid bar 50 is rigidly secured at one end thereof by rivet 52 to brace or bracket 53 which fits within the wiper arm channel 51. Another portion of elongated bar 50 which is proximate the other end thereof is securely affixed to the channel 51 by swaging the end of the latter about the bar in a manner described above relative to FIG. 2. Brace 53 may be a substantially solid member which is similar in shape to bracket 25' of FIG. 5, except that it is not provided with an aperture for receiving rivet 54 which fastens the bracket to the channel. More specifically, in the interest of reducing the weight of bracket 53, the portion thereof which is in contact with rivet 54 is not a complete aperture, but merely hooks around rivet 54. Notwithstanding that the rivet is not surrounded on all sides by parts of the bracket, bracket 53 is held securely within channel 51 because the three sides thereof are in firm engagement with three sides of the channel. The modification of FIG. 6 is especially unique in that the end 55 of elongated torsion bar 50 provides a saber type of connection for mounting a windshield wiper blade. In other words, the construction of FIG. 6 not only retains the efficiency of the construction described above in FIG. 2, but in addition can be manufactured at a lower cost because the saber for mounting the wiper blade is an integral portion of the elongated torsional bracing bar structure. Except for the above-described structure, the remainder of the arm in FIG. 6, namely the spring and mounting head structure, may be the same as described above relative to FIG. 2. In its preferred form, solid bar 50 is of rectangular cross-section. However, it will readily be appreciated that it may be of any other desired cross-sectional configuration or of any desired combination of cross-sectional shapes.

It will thus be seen that improved torsion-resistant wiper arm constructions have been described which are manifestly capable of achieving the above enumerated objects, and while preferred embodiments of the present invention have been shown, it is to be understood that the present invention is not limited thereto, but may be otherwise embodied within the scope of the following claims.

What is claimed is:

1. A twist resistant wiper arm assembly comprising a primary arm portion with opposed sides means mounted proximate one end of said primary arm portion adapted to be mounted on a rockshaft, means mounted proximate the other end of said primary arm portion for mounting a windshield wiper, an elongated secondary arm portion having a higher resistance to twisting than said primary arm portion, and connecting means for rigidly joining said secondary arm portion to said opposed sides of said primary arm portion between said ends thereof and proximate said end which mounts said windshield wiper with the longitudinal axes of said arm portions extending in substantially the same direction whereby said secondary arm portion imparts torsional rigidity to said primary arm portion.

2. A twist resistant wiper arm assembly comprising a primary arm portion having a channel-shaped cross section with opposed sides, means mounted proximate one end of said primary arm portion adapted to be mounted on a rockshaft, means mounted proximate the other end of said primary arm portion for mounting a windshield wiper, an elongated secondary arm portion of tubular cross section having a higher resistance to twisting than said primary arm portion, and connecting means for rigidly joining said tubular secondary arm portion to said opposed sides of said primary arm portion at longitudinally spaced areas with the longitudinal axes of said arm portions extending in substantially the same direction whereby said secondary arm portion imparts torsional rigidity to said primary arm portion.

3. A twist resistant wiper arm assembly comprising a tapered channel-shaped member with opposed sides and having a relatively large end and a relatively small end, means mounted proximate said relatively large end adapted to be mounted on a rockshaft, means mounted proximate said relatively small end for mounting a windshield wiper, an elongated tubular member extending lengthwise of said channel-shaped member, and means for rigidly joining said elongated tubular member to said opposed sides of said channel-shaped member and proximate said relatively small end of said channel-shaped member whereby said elongated tubular member imparts torsional rigidity to said channel-shaped member.

4. A windshield wiper arm construction comprising a head portion adapted to be mounted on a rockshaft, a channel member having opposed sides movably mounted relative to said head portion, spring means affixed between said head portion and said channel member for biasing said channel member toward a windshield, an elongated brace member positioned within said channel member, means for rigidly affixing said elongated brace member to said opposed sides of said channel member and at a position spaced along the longitudinal axis of said channel member, and a cover plate adapted to extend across the open side of said channel member.

5. A windshield wiper arm construction comprising a head portion adapted to be mounted on a rockshaft, an elongated channel-shaped arm portion having opposed sides movably mounted relative to said head portion, a first anchor member mounted on said head portion, a second anchor member mounted on said arm portion between said opposed sides, spring means extending between said first and second anchor members for biasing said arm portion toward a windshield, an elongated torsion resistant member having one end thereof affixed relative to said opposed sides of said arm portion by said second anchor member and being rigidly affixed proximate the other end thereof to a point on said arm portion which is spaced from said anchor member whereby said elongated torsion resistant member supports said opposite sides against relative movement.

6. A windshield wiper arm construction comprising a head portion adapted to be mounted on a rockshaft, an elongated channel-shaped arm portion with opposed sides having one end thereof movably mounted on said head portion, a wiper blade mounting member mounted proximate the other end of said arm portion, a first anchor member mounted on said head portion, a second anchor member mounted on said arm portion and secured to said opposed sides, spring means extending between said first and second anchor members for biasing said arm portion toward a windshield, an elongated torsion resistant member having one end thereof affixed relative to said opposed sides of said arm portion by said second anchor member and the other end thereof rigidly affixed proximate said other end of said arm portion by a swaged joint which also retains said wiper blade mounting member whereby said elongated torsion resistant member prevents said opposed sides from moving relative to each other.

7. A windshield wiper arm construction comprising a head portion adapted to be mounted on a rockshaft, a channel member having opposed sides mounted on said head portion, an elongated brace member positioned within said channel member and extending for a substantial portion of the length thereof, means for fixedly securing said elongated brace member at a first position to said opposed sides of said channel member and at a second position spaced along the longitudinal axis of said channel member from said first position, said elongated brace member extending beyond the end of said channel member, and means on said end of said brace member for mounting a windshield wiper blade structure.

8. A twist resistant wiper arm assembly comprising a head portion adapted to be mounted on a rockshaft, an elongated tapered channel-shaped member having opposed sides, means for pivotally mounting said elongated tapered channel-shaped member on said head portion, means on said tapered channel-shaped member for mounting a wiper blade, first spring anchoring means on said head portion, second spring anchoring means on said tapered channel-shaped member, a biasing spring extending between said first and second anchoring means for biasing said tapered channel-shaped member toward a windshield, an elongated twist resistant brace member having an axis adapted to extend in substantially the same general direction as the axis of said tapered channel-shaped member for imparting torsional rigidity to said tapered channel-shaped member, first means centrally located between the ends of said tapered channel-shaped portion and secured to said opposed sides of said channel member for securely fastening a portion of said elongated brace member to said tapered channel-shaped portion whereby said brace member effectively supports said sides of said channel member against relative movement therebetween, and second means located proximate the smaller end of said tapered channel-shaped portion for rigidly securing a portion of said elongated brace member which is spaced from said first means so that the portion of said tapered channel-shaped member between said first and second means is reinforced by said elongated brace member, whereby said elongated brace member imparts torsional rigidity to said tapered channel-shaped member.

References Cited in the file of this patent

UNITED STATES PATENTS

| | | |
|---|---|---|
| 2,245,244 | Zaiger | June 10, 1941 |
| 2,348,502 | Smulski | May 9, 1944 |
| 2,736,053 | Oishei et al. | Feb. 28, 1956 |
| 2,838,782 | Wallis | June 17, 1958 |
| 2,850,755 | Deibel | Sept. 9, 1958 |
| 2,860,364 | Krohm | Nov. 18, 1958 |